US010229600B2

(12) United States Patent
So

(10) Patent No.: US 10,229,600 B2
(45) Date of Patent: Mar. 12, 2019

(54) NAVIGATION SYSTEM WITH TRAFFIC FLOW MECHANISM AND METHOD OF OPERATION THEREOF

(71) Applicant: Telenav, Inc., Santa Clara, CA (US)

(72) Inventor: Herman Ho-Man So, Redwood City, CA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 15/439,862

(22) Filed: Feb. 22, 2017

(65) Prior Publication Data

US 2018/0240345 A1   Aug. 23, 2018

(51) Int. Cl.
*G08G 1/16* (2006.01)
*G05D 1/02* (2006.01)
*B60W 30/16* (2012.01)
*B60W 30/14* (2006.01)
*B60W 30/08* (2012.01)

(52) U.S. Cl.
CPC ............ *G08G 1/167* (2013.01); *B60W 30/08* (2013.01); *B60W 30/143* (2013.01); *B60W 30/16* (2013.01); *G05D 1/0214* (2013.01); *G05D 1/0223* (2013.01); *G08G 1/161* (2013.01); *G08G 1/166* (2013.01); *B60W 2550/10* (2013.01); *B60W 2550/30* (2013.01); *B60W 2750/308* (2013.01); *G08G 1/162* (2013.01)

(58) Field of Classification Search
CPC ........ G08G 1/161; G08G 1/166; G08G 1/167; G05D 1/0214; G05D 1/0223; B60W 30/08; B60W 30/16; B60W 30/143; B60W 2550/10; B60W 2550/30; B60W 2550/308

See application file for complete search history.

(56) References Cited

U.S. PATENT DOCUMENTS

| | | | |
|---|---|---|---|
| 7,725,254 B2* | 5/2010 | Sumizawa et al. | G01C 21/3461 701/423 |
| 8,165,776 B2* | 4/2012 | Sugawara et al. | B60W 30/12 701/96 |
| 9,449,515 B2 | 9/2016 | Rubin et al. | |
| 2007/0135989 A1 | 6/2007 | Hengst | |
| 2010/0256852 A1* | 10/2010 | Mudalige et al. | G08G 1/163 701/24 |
| 2013/0018572 A1 | 1/2013 | Jang | |
| 2015/0012167 A1 | 1/2015 | Wolter | |
| 2015/0081201 A1 | 3/2015 | Rubin et al. | |
| 2016/0297447 A1* | 10/2016 | Suzuki | B60W 30/18163 |
| 2016/0304097 A1* | 10/2016 | Taira et al. | B60W 30/18163 |
| 2017/0088144 A1* | 3/2017 | Shibata | G08G 1/167 |
| 2017/0203764 A1* | 7/2017 | Fujiki et al. | B60W 30/18163 |

\* cited by examiner

*Primary Examiner* — Dale W Hilgendorf
(74) *Attorney, Agent, or Firm* — Perspectives Law Group, Corp.

(57) ABSTRACT

A method of operation of a navigation system includes: determining a buffer distance meeting or exceeding a size threshold between obstacle locations; determining a merge timing based on a current location relative to the buffer distance; determining a lane placement based on a travel time meeting or exceeding a time threshold; and executing a lane merge operation with a control unit based on the merge timing, the lane placement, or a combination thereof for guiding a user's vehicle to merge onto a lane different from currently traveled.

20 Claims, 5 Drawing Sheets

NAVIGATION SYSTEM WITH TRAFFIC FLOW MECHANISM AND METHOD OF OPERATION THEREOF

TECHNICAL FIELD

The present invention relates generally to a navigation system, and more particularly to a system with traffic flow mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system improving traffic flow mechanism to control an operation of vehicle has become a paramount concern for the consumer. The inability decreases the benefit of using the tool.

Thus, a need still remains for a navigation system with traffic flow mechanism to a device during operation of vehicle. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a buffer distance meeting or exceeding a size threshold between obstacle locations; determining a merge timing based on a current location relative to the buffer distance; determining a lane placement based on a travel time meeting or exceeding a time threshold; and executing a lane merge operation with a control unit based on the merge timing, the lane placement, or a combination thereof for guiding a user's vehicle to merge onto a lane different from currently traveled.

The present invention provides a navigation system, including: a control unit for: determining a buffer distance meeting or exceeding a size threshold between obstacle locations; determining a merge timing based on a current location relative to the buffer distance; determining a lane placement based on a travel time meeting or exceeding a time threshold; and executing a lane merge operation with a control unit based on the merge timing, the lane placement, or a combination thereof; and a communication unit, coupled to the control unit, for transmitting the lane merge operation for guiding a user's vehicle to merge onto a lane different from currently traveled.

The present invention provides a navigation system having a non-transitory computer readable medium including instructions for execution, the instructions comprising: determining a buffer distance meeting or exceeding a size threshold between obstacle locations; determining a merge timing based on a current location relative to the buffer distance; determining a lane placement based on a travel time meeting or exceeding a time threshold; and executing a lane merge operation based on the merge timing, the lane placement, or a combination thereof for guiding a user's vehicle to merge onto a lane different from currently traveled.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
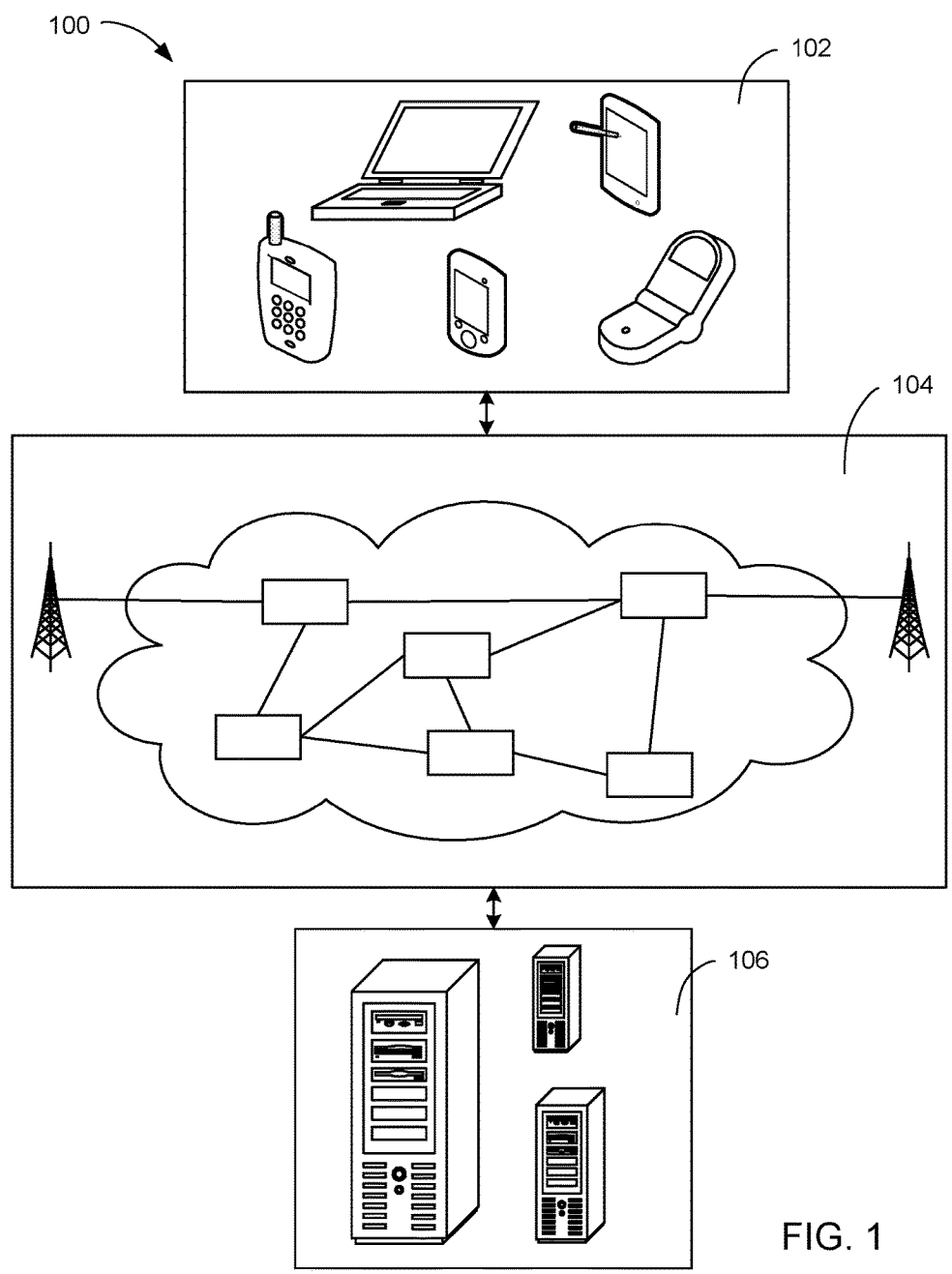
FIG. 1 is a navigation system with traffic flow mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown a navigation system 100 with traffic flow mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, a head unit, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, BLUETOOTH, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
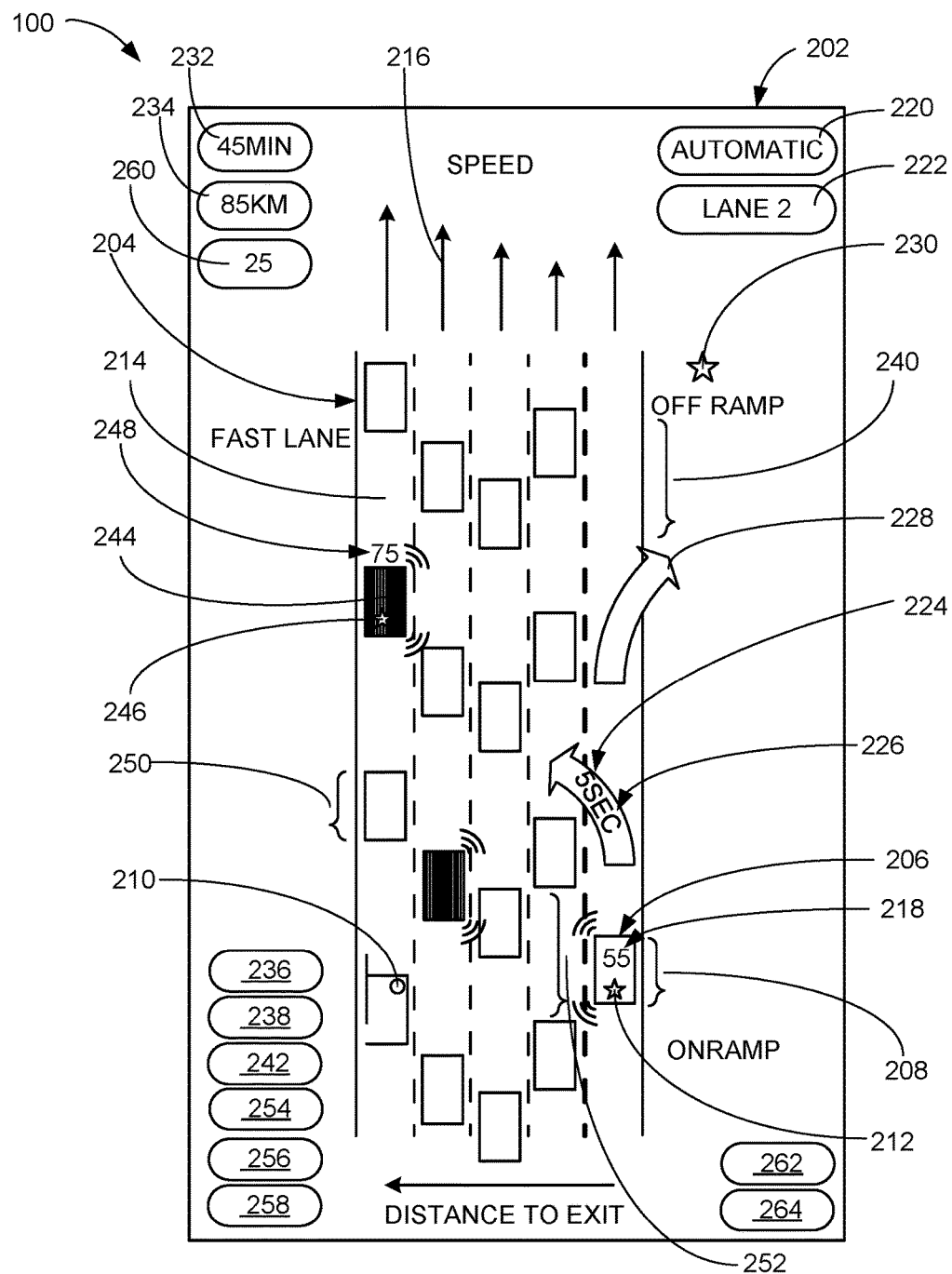
FIG. 2 is an example of information considered by the navigation system.

Referring now to FIG. 2, there is shown an example of information considered by the navigation system 100. For clarity and brevity, the discussion of the embodiment of the present invention will focus on the first device 102 delivering the result generated by the navigation system 100. However, the second device 106 and the first device 102 can be discussed interchangeably. The first device 102 and the second device 106 can communicate via the communication path 104.

A travel context 202 is defined as a situation or circumstance surrounding the first device 102 while traveling. For example, the travel context 202 can include a traffic condition on a road segment 204 such as no traffic, moderate traffic, heavy traffic, traffic jam, standstill, or a combination thereof traveled by a user's vehicle 206. For a different example, the travel context 202 can include a time of day, week, month, year, season, or a combination thereof. For another example, the travel context 202 can include a weather condition while traveling on the road segment 204.

The user's vehicle 206 is defined as a machine that a user of the first device 102 travels on. For example, the first device 102 can be installed on the user's vehicle 206 or the user can carry the first device 102 while traveling on the user's vehicle 206. The user's vehicle 206 can include manual driving vehicle or self-driving vehicle. The user's vehicle 206 can include gasoline powered vehicle, electric powered vehicle, hydrogen powered vehicle, or a combination thereof. The user's vehicle 206 can include a transport vehicle for air, land, sea, or a combination thereof. A user's vehicle size 208 is defined as a physical dimension of the user's vehicle 206. For example, the user's vehicle size 208 can include the length, height, width, or a combination thereof of the user's vehicle 206.

The user's vehicle 206 can include a capturing device 210. The capturing device can capture, track, monitor, detect, or a combination thereof the user of the first device 102 or surrounding of the user of the first device 102, the user's vehicle 206, or a combination thereof. For example, the capturing device 210 can include a digital camera, video camera, thermal camera, night vision camera, infrared camera, x-ray camera, or the combination thereof. The user's vehicle 206 can include multiple instances of the capturing device 210 placed in various location on the user's vehicle 206.

A current location 212 is defined as a physical location of the first device 102. For example, the current location 212 can represent the physical location of the user with the first device 102, the user's vehicle 206 with the first device 102, or a combination thereof.

The road segment 204 is defined as a path one can travel from one physical location to another physical location. The road segment 204 can include a dirt path, local road, arterial road, expressway, freeway, highway, tolled road, or a combination thereof. For example, the user's vehicle 206 can travel on the road segment 204 representing the highway for commuting to work.

The road segment 204 can include a lane 214. The lane 214 is defined as a part of the road segment 204. For example, the road segment 204 can be divided by markers to create multiple instances of the lane 214. The marker can include, for example, a painted line, physical reflective light, or a combination thereof. The marker can also include a device to indicate operator of the vehicle the separation between one instance of the lane 214 to another. For example, the road segment 204 representing a highway can include five instances of the lane 214 as illustrated in FIG. 2 going towards the same direction.

The lane 214 can include a lane speed 216. The lane speed 216 is defined as a speed limit for the lane 214. For example, the road segment 204 can include five instances of the lane 214. Each instance of the lane 214 can have the lane speed 216 different from one another. More specifically as an example, the lane 214 closest to the center divider can have the lane speed 216 that is the fastest while the lane furthest from the center divider can have the lane speed 216 that is the slowest.

The navigation system 100 can set the lane speed 216 for each instance of the lane 214 in autonomous vehicle system. The autonomous vehicle system can represent an infrastructure where the vehicle is controlled by the navigation system 100. As a result, the navigation system 100 can control how fast the vehicle should travel on the road segment 204. The navigation system 100 can predefine the lane speed 216 for how fast the vehicle will travel for each instance of the lane 214.

A travel speed 218 is defined as a rate of motion for the user's vehicle 206. For example, the user's vehicle 206 can travel at the travel speed 218 set by the lane speed 216 of the lane 214. An operation mode 220 is defined a mechanism to operate a vehicle. For example, the operation mode 220 can include automatic, manual, or a combination thereof. The navigation system 100 can control the user's vehicle 206 if the operation mode 220 represents the automatic mode. The user can control the user's vehicle 206 if the operation mode 220 represents manual mode.

The navigation system 100 can determine a lane placement 222 to control where the user's vehicle 206 can travel on the road segment 204. The lane placement 222 is defined as a process to place a vehicle on the lane 214. For example, once the user's vehicle 206 is operating in the operation mode 220 of automatic mode, the navigation system 100 can execute the lane placement 222 to determine the lane 214 where the user's vehicle 206 can travel on the road segment 204.

The navigation system 100 can execute a lane merge operation 224 to control the user's vehicle 206. The lane merge operation 224 is defined as a process to perform a lane change from one instance of the lane 214 to another instance of the lane 214. For example, while the user's vehicle 206 is traveling along the road segment 204, the navigation system 100 can perform the lane merge operation 224 to move the user's vehicle 206 from the lane 214 furthest from the center divider to the lane 214 closest to the center divider. The navigation system 100 can perform multiple instances of the lane merge operation 224 to guide the user's vehicle 206 across multiple instances of the lane 214 to reach the lane 214 where the navigation system 100 had determined for the user's vehicle 206 to travel on.

More specifically as an example, the navigation system 100 can execute the lane merge operation 224 at a merge timing 226. The merge timing 226 is defined as a situation or time determined as safe for the user's vehicle 206 to merge into the lane 214 different from currently traveled. The merge timing 226 can represent a situation when a physical distance between two vehicles is large enough, thus safe, for the user's vehicle 206 in order to merge into the lane 214. For a different example, the merge timing 226 can include current time, future time, or a combination thereof. For future time can include time measurement in the future represented in seconds, minutes, hours, or a combination thereof.

The navigation system 100 can execute a lane exit operation 228 to control the user's vehicle 206. The lane exit operation 228 is defined as a process to control the exit of the user's vehicle 206 from the road segment 204. For example, once the user's vehicle 206 nears an exit location 230, the navigation system 100 can execute the lane exit operation 228 to guide the user's vehicle 206 off the road segment 204. The exit location 230 is defined as an exit to the road segment 204. For example, the exit location 230 can include an off ramp to the highway, an intersection with another instance of the road segment 204, or a combination thereof.

The navigation system 100 can consider factor or factors to execute the lane placement 222, the lane merge operation 224, the lane exit operation 228, or a combination thereof. A travel time 232 is defined a duration of user's travel. For example, the travel time 232 can represent the time required to travel from a start location to a target destination. A travel distance 234 is defined as a physical distance of user's travel. For example, the travel distance 234 can represent the physical distance required to travel from the start location to the target destination.

A time threshold 236 is defined as a limit on the time duration. For example, the time threshold 236 can represent a minimum or maximum time duration. A distance threshold 238 is defined as a limit on the physical distance. For example, the distance threshold 238 can represent a minimum or maximum physical distance. An exit distance 240 is defined as physical distance from the current location 212 to the exit location 230. An alternative exit location 230 is defined as an exit different from the exit location 230.

An obstacle factor 242 is defined as information considered by the navigation system 100 to control the user's vehicle 206. For example, the obstacle factor 242 can include an obstacle vehicle 244, an obstacle location 246, an obstacle speed 248, an obstacle size 250, a buffer distance 252, or a combination thereof. For further example, the obstacle factor 242 can include a vehicle type 254, a vehicle image 256, a vehicle data 258, a vehicle count 260, or a combination thereof.

The obstacle vehicle 244 is defined as a machine traveled by other user. For example, the user's vehicle 206 and the obstacle vehicle 244 can be traveling on the same instance of the road segment 204 but traveling on differences instances of the lane 214. The obstacle vehicle 244 can include manual driving vehicle or self-driving vehicle. The obstacle vehicle 244 can include gasoline powered vehicle, electric powered vehicle, hydrogen powered vehicle, or a combination thereof. The obstacle vehicle 244 can include a transport vehicle for air, land, sea, or a combination thereof.

The obstacle location 246 is defined as a physical location of the obstacle vehicle 244. The obstacle speed 248 is defined as a rate of motion for the obstacle vehicle 244. The obstacle size 250 is defined as a physical dimension of the obstacle vehicle 244. For example, the obstacle size 250 can include the length, height, width, or a combination thereof of the obstacle vehicle 244.

The buffer distance 252 is defined as a physical distance between the current location 212 and the obstacle location 246. For example, the buffer distance 252 between the user's vehicle 206 and the obstacle vehicle 244 can be greater than the user's vehicle size 208. More specifically as an example, the buffer distance 252 can meet or exceed a size threshold 262 in order for the navigation system 100 to determine that the user's vehicle 206 can merge in to the lane 214 between two instances of the obstacle vehicle 244. The size threshold 262 is defined as a limit on the physical distance required in order for execute the lane merge operation 224. For example, the size threshold 262 can represent a minimum or maximum instance of the buffer distance 252.

The vehicle type 254 is defined as a classification of a vehicle. For example, the vehicle type 254 can include a type of vehicle for the user's vehicle 206, the obstacle vehicle 244, or a combination thereof. The vehicle data 258 is defined as information of a vehicle. For example, the vehicle data 258 can include the user's vehicle size 208, the obstacle size 250, or a combination thereof. The vehicle image 256 is defined as a visual depiction of a vehicle stored in a medium. For example, the vehicle image 256 can include a photograph, video, or a combination thereof.

The vehicle count 260 is defined as a tally of number of vehicle on the road segment 204. A count threshold 264 is defined as a limit on the tally. For example, the count threshold 264 can represent the minimum or maximum number of the vehicle.

Figure 3:
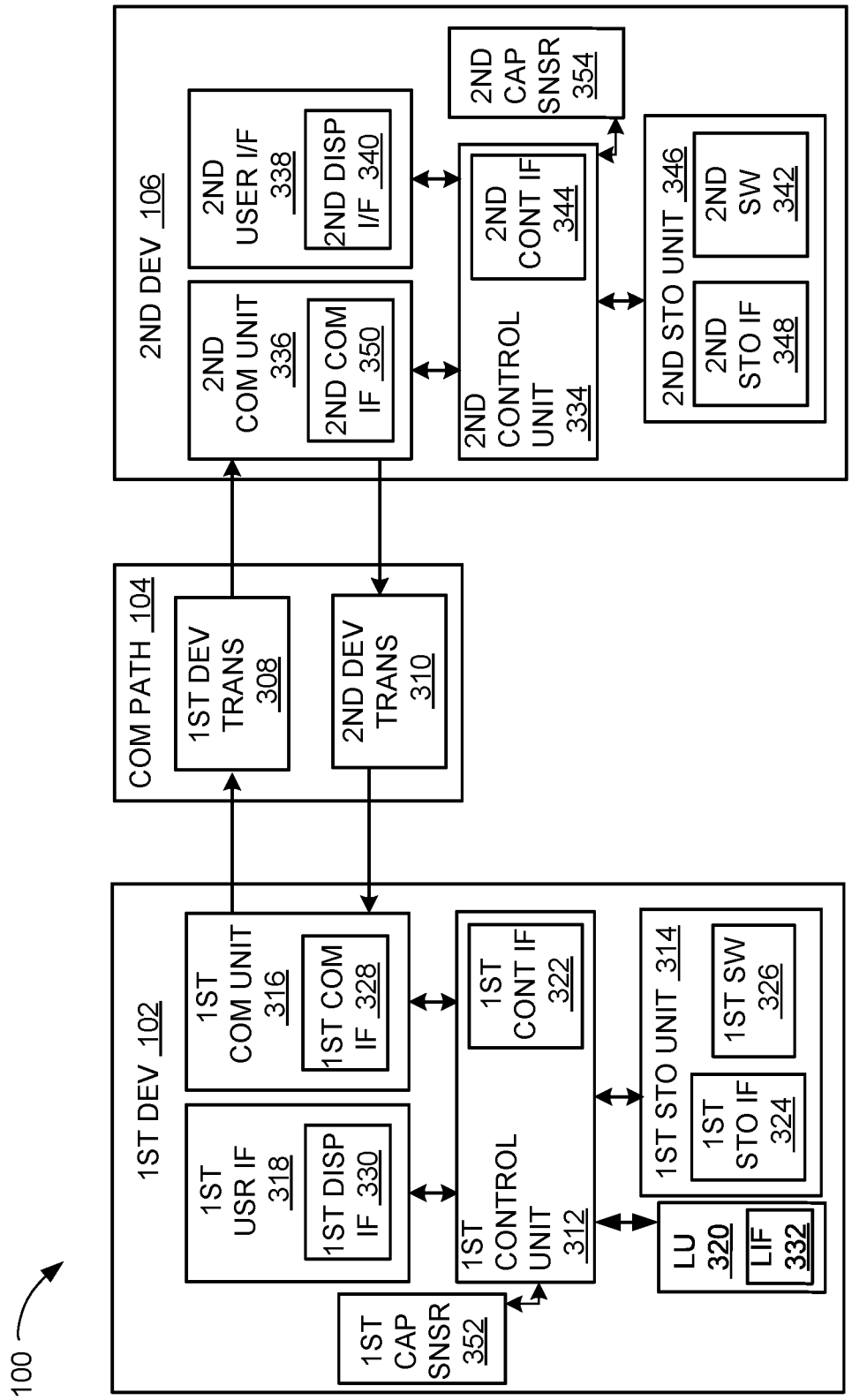
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the navigation system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations physically separate from the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations physically separate from the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations physically separate from the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, a camera, or any combination thereof to provide data and communication inputs.

The first user interface 318 can include a first display interface 330. The first display interface 330 can include a display, a projector, a video screen, a speaker, a headset, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, a camera, or any combination thereof to provide data and communication inputs. Examples of the output device of the second user interface 338 can include a second display interface 340. The second display interface 340 can include a display, a projector, a video screen, a speaker, a headset, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations physically separate from the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations physically separate from the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

A first capturing device 352 can represent the capturing device 210 of FIG. 2. Examples of the first capturing device 352 can include a digital camera, video camera, thermal camera, night vision camera, infrared camera, x-ray camera, or the combination thereof. Examples of the first capturing device 352 can further include accelerometer, thermometer, microphone, wireless signal receiver, remote physiological monitoring device, light identifier, magnetic sensor, or the combination thereof.

A second capturing device 354 can represent the capturing device 210. Examples of the second capturing device 354 can include a digital camera, video camera, thermal camera, night vision camera, infrared camera, x-ray camera, or the combination thereof. Examples of the second capturing device 354 can further include accelerometer, thermometer, microphone, wireless signal receiver, remote physiological monitoring device, light identifier, magnetic sensor, or the combination thereof.

Figure 4:
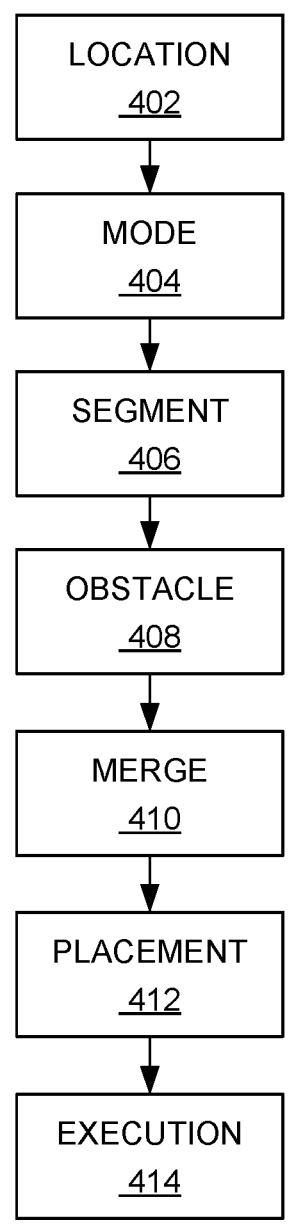
FIG. 4 is a control flow of the navigation system.

Referring now to FIG. 4, therein is shown a control flow of the navigation system 100. The navigation system 100 can include a location module 402. The location module 402 determines the current location 212 of FIG. 2. For example, the location module 402 can determine the current location 212 with the location unit 320 of FIG. 3. The location module 402 can transmit the current location 212 to a mode module 404.

The navigation system 100 can include the mode module 404, which can be coupled to the mode module 404. The mode module 404 determines the operation mode 220 of FIG. 2. For example, the mode module 404 can determine the operation mode 220 based on the current location 212, the road segment 204 of FIG. 2, or a combination thereof.

For a specific example, the road segment 204 can represent an onramp of a highway. The current location 212 determined can represent that the user's vehicle 206 of FIG. 2 with the first device 102 has got on the onramp ready to merge into the road segment 204 representing the highway. Based on the current location 212, the road segment 204, or a combination thereof, the mode module 404 can determine the operation mode 220 by switching from manual operation of the user's vehicle 206 to automatic operation of the user's vehicle 206. The mode module 404 can transmit the operation mode 220 to a segment module 406.

The navigation system 100 can include the segment module 406, which can be coupled to the mode module 404. The segment module 406 determines the lane speed 216 of FIG. 2. For example, the segment module 406 can determine the lane speed 216 based on the travel context 202 of FIG. 2, the road segment 204, or a combination thereof.

The segment module 406 can determine the lane speed 216 in a number of ways. For example, the road segment 204 representing the highway can include multiple instances of the lane 214 of FIG. 2. More specifically as an example, the segment module 406 can determine the lane speed 216 for each instance of the lane 214. For further example, the segment module 406 can determine the lane speed 216 for one instance of the lane 214 can be different from another instance of the lane 214. For example, the lane 214 closer to the center divider can have the lane speed 216 faster than the lane further away from the center divider.

For a different example, the segment module 406 can determine the lane speed 216 based on the travel context 202, the road segment 204, or a combination thereof. The segment module 406 can determine the lane speed 216 to be different for the same instance of the road segment 204 if the travel context 202 is different. More specifically as an example, the travel context 202 can represent various instances of a weather condition. For a specific example, the segment module 406 can decrease the lane speed 216 if the weather condition deteriorates while increase the lane speed 216 if the weather condition improves. For example, even if the user's vehicle 206 including the first device 102 is traveling along the same instance of the road segment 204, the lane speed 216 on the road segment 204 during rain can be slower than the lane speed 216 when the weather condition is sunny.

For further example, the segment module 406 can adjust the lane speed 216 based on the travel context 202. For a specific example, the travel context 202 can represent the user's vehicle 206 including the first device 102 traveling through different time of day, month, year, season, or a combination thereof. More specifically as an example, the segment module 406 can adjust the lane speed 216 of the road segment 204 to be faster while the sun is up than the lane speed 216 when the sun is down.

For a different example, the segment module 406 can adjust the lane speed 216 based on the travel context 202 representing a traffic condition on the road segment 204. More specifically as an example, if a traffic accident occurs, the segment module 406 can decrease the lane speed 216 for the road segment 204 and increase the lane speed 216 if the traffic accident is resolved. The segment module 406 can transmit the lane speed 216 to an obstacle module 408.

The navigation system 100 can include the obstacle module 408, which can be coupled to the segment module 406. The obstacle module 408 determines the obstacle factor 242 of FIG. 2. For example, the obstacle module 408 can determine the obstacle factor 242 for the obstacle vehicle 244 of FIG. 2 including the obstacle location 246 of FIG. 2, the obstacle speed 248 of FIG. 2, the obstacle size 250 of FIG. 2, the buffer distance 252 of FIG. 2, or a combination thereof. The obstacle vehicle 244 can represent another vehicle other than the user's vehicle 206.

The obstacle module 408 can determine the obstacle factor 242 in a number of ways. For example, the obstacle module 408 can determine the obstacle location 246 representing another vehicle traveling on the road segment 204 where the user's vehicle 206 is traveling. More specifically as an example, the obstacle module 408 can determine the obstacle location 246 based on the geographic coordinate provided by the GPS of the obstacle vehicle 244.

For another example, the obstacle module 408 can determine the obstacle location 246 relative to the current location 212 using real-time locating systems. The user's vehicle 206 can include multiple instance of the capturing device 210 of FIG. 2, the first communication unit 316 of FIG. 3, or a combination thereof. For example, the capturing device 210 can represent the wireless signal receiver to communicate with other instances of the capturing device 210, the first communication unit 316, or a combination thereof running on other vehicle including the obstacle vehicle 244. For another example, the capturing device 210 can represent the magnetic sensor to communicate with another instance of the capturing device 210 representing the magnetic sensor running on other device.

For a specific example, the obstacle module 408 can determine the obstacle location 246 relative to the current location 212 based on real-time location technologies including, for example, radio frequency identification, infrared, radio beacon, ultrasound identification, wireless local area network, BLUETOOTH ™, or a combination thereof. For a different example, the obstacle module 408 can determine the obstacle location 246 relative to the current location 212 based on the magnetic sensor detecting the magnetic field from the obstacle vehicle 244.

The obstacle module 408 can determine the obstacle speed 248 of the obstacle vehicle 244. For example, the obstacle module 408 can determine the obstacle speed 248 based on the rate of change between one instance of the obstacle location 246 and another instance of the obstacle location 246 for the same instance of the obstacle vehicle 244 traveling on the road segment 204. For a different example, the obstacle module 408 can determine the obstacle speed 248 based on the lane speed 216 set for the lane 214, the road segment 204, or a combination thereof traveled by the obstacle vehicle 244. The lane 214 traveled by the obstacle vehicle 244 can be same or different from the lane 214 traveled by the user's vehicle 206 including the first device 102.

The obstacle module 408 can determine the obstacle size 250 of the obstacle vehicle 244. For example, the obstacle module 408 can determine the obstacle size 250 based on the vehicle type 254 of FIG. 2, the vehicle image 256 of FIG. 2, the vehicle data 258 of FIG. 2, or a combination thereof.

For a specific example, the obstacle module 408 can determine the obstacle size 250 based on the vehicle type 254. The vehicle type 254 can include sedan, minivan, sports utility vehicle, truck, bus, or a combination thereof. The vehicle type 254 can also include specific brand of the vehicle including Ford™, Toyota™, Tesla™, or Ferrari™. The vehicle type 254 can include the vehicle data 258 indicating the dimension of the obstacle vehicle 244. Based on the vehicle type 254, the vehicle data 258, or a combination thereof, the obstacle module 408 can determine the obstacle size 250 of the obstacle vehicle 244.

For another example, the obstacle module 408 can determine the obstacle size 250 based on the vehicle image 256 captured by the capturing device 210. The capturing device 210 can represent the digital camera. The obstacle module 408 can determine the obstacle size 250 utilizing computer vision technology, deep learning technology, or a combination thereof to identify the obstacle vehicle 244 captured in the vehicle image 256. The obstacle module 408 can compare the obstacle vehicle 244 identified in the vehicle image 256 to the vehicle data 258 corresponding to the obstacle vehicle 244 to determine the vehicle type 254. As a result, the obstacle module 408 can determine the obstacle size 250 of the obstacle vehicle 244 identified captured in the vehicle image 256.

The obstacle module 408 can determine the buffer distance 252 between the obstacle location 246 and the current location 212, between one instance of the obstacle location 246 and another instance of the obstacle location 246, or a combination thereof. For example, the buffer distance 252 can be determined for the obstacle vehicle 244 in front, behind, to the side, diagonally in front, diagonally behind, or a combination thereof relative to the current location 212 or another instance of the obstacle vehicle 244. The obstacle module 408 can determine the buffer distance 252 based on calculating the physical distance between the obstacle location 246 and the current location 212, between the obstacle location 246 and another instance of the obstacle location 246, or a combination thereof. The obstacle module 408 can determine the buffer distance 252 based on calculating the amount of time required to travel the physical distance between the obstacle location 246 and the current location 212, between the obstacle location 246 and another instance of the obstacle location 246, or a combination thereof.

More specifically as an example, the obstacle module 408 can determine the buffer distance 252 with the capturing device 210 using the infrared to calculate the physical distance between the obstacle location 246 and the current location 212. The obstacle module 408 can determine multiple instances of the buffer distance 252 by determining the physical distances between each of another vehicle relative to the user's vehicle 206 including the first device 102, between one vehicle other than the user's vehicle 206 to another vehicle, or a combination thereof.

For another example, the obstacle module 408 can determine the buffer distance 252 based on the obstacle location 246 of one vehicle and the obstacle location 246 of another vehicle. As discussed above, the buffer distance 252 can be determined based on between each instance of the obstacle location 246 representing the GPS coordinate of the obstacle vehicle 244.

For a different example, the obstacle module 408 can determine the buffer distance 252 based on the obstacle speed 248, the obstacle location 246, the obstacle size 250, the user's vehicle size 208 of FIG. 2, or a combination thereof. More specifically as an example, the obstacle module 408 can determine the buffer distance 252 based on the obstacle speed 248 to calculate the time required to travel from one instance of the obstacle location 246 to another instance of the obstacle location 246. The time required can indicate the physical distance available between the two instances of the obstacle vehicle 244.

Based on the user's vehicle size 208 of the user's vehicle 206, the obstacle module 408 can determine the buffer distance 252 required for merging into the lane 214 traveled by the two instance of the obstacle vehicle 244 representing other vehicles. More specifically as an example, the obstacle module 408 can determine the buffer distance 252 based on meeting or exceeding the size threshold 262 of FIG. 2 for the user's vehicle 206 to safely merge into the lane 214 to travel between the two instance of the obstacle vehicle 244. The size threshold 262 can represent the physical distance that can fit the user's vehicle size 208 safely if the user's vehicle 206 merge into the lane 214 behind one instance of other vehicle and in front of another instance of other vehicle.

For a different example, the obstacle module 408 can determine the buffer distance 252 based on the vehicle count 260 of FIG. 2 meeting or exceeding a count threshold 264 on the road segment 204. More specifically as an example, the vehicle count 260 can differ based on the travel context 202. The vehicle count 260 during the travel context 202 representing the traffic jam can be greater the vehicle count 260 during the travel context 202 representing no traffic jam. As a result, the obstacle module 408 can determine the buffer distance 252 during the traffic jam to be greater than the buffer distance 252 when there is no traffic jam.

More specifically as an example, the obstacle module 408 can determine multiple instances of the buffer distance 252 based on the different instances of the travel context 202 representing various instances of the traffic condition. For example, multiple instances of the count threshold 264 can be set to qualify different instances of the traffic condition. For a specific example, the count threshold 264 for no traffic jam can be different from the count threshold 264 for moderate traffic jam. As the vehicle count 260 meets or exceeds each instance of the count threshold 264, the obstacle module 408 can consider each traffic condition to adjust the buffer distance 252 accordingly.

For further example, the obstacle module 408 can generate the buffer distance 252. More specifically as an example, if the physical distance between the vehicles traveling on the lane 214 that the user's vehicle 206 is trying to merge into is less than the size threshold 262, the obstacle module 408 can generate the buffer distance 252 by adjusting the obstacle speed 248 of the vehicle on the back to create physical space that meets or exceeds the size threshold 262. The obstacle module 408 can generate the buffer distance 252 by increasing or reducing the obstacle speed 248. The obstacle module 408 can transmit the obstacle factor 242 to a merge module 410.

It has been discovered that the navigation system 100 generating the buffer distance 252 improves performance of the navigation system 100 to control the user's vehicle 206 to change the lane 214. By generating the buffer distance 252, the navigation system 100 can improve the accuracy of when to guide the user's vehicle 206 to change the lane 214 by explicitly creating the physical space necessary to change lane. As a result, the navigation system 100 can minimize the resource required to determine when the merge timing 226 of FIG. 2 is and control the user's vehicle 206 to change the lane 214 safely.

The navigation system 100 can include the merge module 410, which can be coupled to the obstacle module 408. The merge module 410 determines the merge timing 226. For example, the merge module 410 can determine the merge timing 226 based on the current location 212, the obstacle factor 242, the user's vehicle size 208, the travel context 202, or a combination thereof.

The merge module 410 can determine the merge timing 226 in a number of ways. For example, the merge module 410 can determine the merge timing 226 based on the current location 212, the buffer distance 252, the user's vehicle size 208, or a combination thereof. More specifically as an example, as discussed above, the determination of the buffer distance 252 meeting or exceeding the user's vehicle size 208 can indicate that there is sufficient physical space between instances of the obstacle vehicle 244 representing other vehicles in the lane 214 where the user's vehicle 206 wishes to merge into.

The merge module 410 can determine the merge timing 226 based on the current location 212 relative to the location of the buffer distance 252. When the current location 212 of the user's vehicle 206 is adjacent to the buffer distance 252, the merge module 410 can determine the merge timing 226 for the user's vehicle 206 to merge into the lane 214 with the buffer distance 252.

For another example, the merge module 410 can determine the merge timing 226 based on the obstacle speed 248, the obstacle size 250, or a combination thereof. As discussed above, the road segment 204 having multiple instances of the lane 214 can have the lane speed 216 different one another. As a result, the obstacle speed 248 traveling on the lane 214 can be different from the travel speed 218 of FIG. 2 the user's vehicle 206.

Continuing with the example, the merge module 410 can determine the merge timing 226 based on identifying the buffer distance 252 becoming adjacent to the current location 212 in the future time of five seconds later from current time. More specifically as an example, the lane speed 216 of the lane 214, the obstacle speed 248, or a combination that the user's vehicle 206 desires to merge into can be greater than the travel speed 218. As discussed above, the buffer distance 252 between front instance of the obstacle vehicle 244 and the back instance of the obstacle vehicle 244 can be determined as sufficient for the user's vehicle 206 merge into, which can be five seconds later. The merge module 410 can determine the merge timing 226 as when the back extent of the other vehicle in the front traveling in the adjacent instance of the lane 214 has passed the front extent of the user's vehicle 206. More specifically as an example, factoring the obstacle size 250, the obstacle location 246, or a combination thereof, the merge timing 226 for the user's vehicle 206 to initiate the merging maneuver can be determined as when the back extent of the other vehicle in the front traveling in the adjacent instance of the lane 214 has passed the user's vehicle 206 and where there is sufficient space for the buffer distance 252 for the user's vehicle to merge into.

For a different example, the lane speed 216 of the lane 214, the obstacle speed 248, or a combination thereof that the user's vehicle 206 desires to merge into can be less than the travel speed 218. The merge module 410 can determine the merge timing 226 as when the back extent of the user's vehicle 206 has passed the front extent of the other vehicle in the back traveling in the adjacent instance of the lane 214. More specifically as an example, factoring the obstacle size 250, the obstacle location 246, or a combination thereof, the merge timing 226 for the user's vehicle 206 to initiate the merging maneuver can be determined as when the back extent of the user's vehicle 206 has passed the front extent of the obstacle vehicle 244 traveling in the adjacent instance of the lane 214 and where there is sufficient space for the buffer distance 252 for the user's vehicle 206 to merge into.

The merge module 410 can determine the merge timing 226 based on the travel context 202. The merge module 410 can adjust the merge timing 226 to accommodate the change in the travel context 202. More specifically as an example, the merge module 410 can adjust the merge timing 226 to include different instances of the buffer distance 252 in order for the user's vehicle 206 to merge safely into different instances of the lane 214. For example, the travel context 202 can represent poor weather condition including rain. The merge module 410 can determine the merge timing 226 with the buffer distance 252 greater than the buffer distance 252 permitted for merging when the travel context 202 represents a fair or good weather condition including sunny day. For another example, as discussed above, the merge module 410 can determine the merge timing 226 based on each instance of the buffer distance 252 determined for each instance of the travel context 202 represent differences of the traffic condition. The merge module 410 can transmit the merge timing 226 to a placement module 412.

The navigation system 100 can include the placement module 412, which can be coupled to the merge module 410. The placement module 412 determines and executes the lane placement 222 of FIG. 2. For example, the placement module 412 can determine the lane placement 222 based on the travel time 232 of FIG. 2, the travel distance 234 of FIG. 2, the road segment 204, or a combination thereof.

The placement module 412 can determine and execute the lane placement 222 in a number of ways. For example, the placement module 412 can determine the lane placement 222 based on the travel time 232. More specifically as an example, if the road segment 204 includes multiple instances of the lane 214, the placement module 412 can determine the lane placement 222 of which lane 214 to place based on the duration of the travel time 232.

For example, if the travel time 232 meets or exceeds the time threshold 236 of FIG. 2, the placement module 412 can determine the lane placement 222 to place the user's vehicle on the lane 214 having the greatest instance of the lane speed 216. For further example, the placement module 412 can determine the lane placement 222 for the lane 214 closest to the center divider if the lane 214 allows the lane speed 216 that is fastest than other instance of the lane 214.

In contrast, if the travel time 232 is below the time threshold 236, the placement module 412 can determine the lane placement 222 to place the user's vehicle 206 on the lane 214 having the least instance of the lane speed 216. For further example, the placement module 412 can determine the lane placement 222 for the lane 214 furthest from the center divider if that instance of the lane 214 allows the lane speed 216 that is slowest than other instance of the lane 214.

For another example, the time threshold 236 can be represented as multiple instances of the time threshold 236. More specifically as an example, the number of instances of the time threshold 236 can reflect the number of instances of the lane 214 for the road segment 204. If the road segment 204 can include five instances of the lane 214, the number of instances of the time threshold 236 can represent five to reflect the number of instances of the lane 214. The placement module 412 can determine the lane placement 222 for each instance of the lane 214 based on the travel time 232 meeting or exceeding one instance of the time threshold 236 but below another instance of the time threshold 236. Additionally, the placement module 412 can determine the lane placement 222 for each instance of the lane 214 based on the travel time 232 below one instance of the time threshold 236 but meets or exceeds another instance of the time threshold 236.

It has been discovered that the navigation system 100 determining and executing the lane placement 222 based on the travel time 232 improves performance of the navigation system 100 to control the user's vehicle 206 for traveling on the road segment 204. By factoring the travel time 232, the navigation system 100 can improve the efficiency of controlling the user's vehicle 206 because the lane 214 that the user's vehicle 206 will be placed can be explicitly defined by the lane speed 216 of the lane 214, the travel time 232 meeting or exceeding the time threshold 236, or a combination thereof. As a result, the navigation system 100 can minimize the resource required to execute the lane placement 222 to safely control the user's vehicle 206 on the road segment 204.

For example, the placement module 412 can determine and execute the lane placement 222 based on the travel distance 234. More specifically as an example, if the road segment 204 includes multiple instances of the lane 214, the placement module 412 can determine the lane placement 222 of which lane 214 to place based on the physical distance of the travel distance 234.

For example, if the travel distance 234 meets or exceeds the distance threshold 238 of FIG. 2, the placement module 412 can determine the lane placement 222 to place the user's vehicle 206 on the lane 214 having the greatest instance of the lane speed 216. For further example, the placement module 412 can determine the lane placement 222 for the lane 214 closest to the center divider if that instance of the lane 214 allows the lane speed 216 that is fastest than other instance of the lane 214.

In contrast, if the travel distance 234 is below the distance threshold 238, the placement module 412 can determine the lane placement 222 to place the user's vehicle 206 on the lane 214 having the slowest instance of the lane speed 216. For further example, the placement module 412 can determine the lane placement 222 for the lane 214 furthest from the center divider if the lane 214 allows the lane speed 216 that is slowest than other instance of the lane 214.

For another example, the distance threshold 238 can be represented as multiple instances of the distance threshold 238. More specifically as an example, the number of instances of the distance threshold 238 can reflect the number of instances of the lane 214 for the road segment 204. If the road segment 204 can include four instances of the lane 214, the number of instances of the distance threshold 238 can represent four to reflect the number of instances of the lane 214. The placement module 412 can determine the lane placement 222 for each instance of the lane 214 based on the travel distance 234 meeting or exceeding one instance of the distance threshold 238 but below another instance of the distance threshold 238. Additionally, the placement module 412 can determine the lane placement 222 for each instance of the lane 214 based on the travel distance 234 below one instance of the distance threshold 238 but meets or exceeds another instance of the distance threshold 238.

It has been discovered that the navigation system 100 determining and executing the lane placement 222 based on the travel distance 234 improves performance of the navigation system 100 to control the user's vehicle 206 for traveling on the road segment 204. By factoring the travel distance 234, the navigation system 100 can improve the efficiency of controlling the user's vehicle 206 because the lane 214 that the user's vehicle 206 will be placed can be explicitly defined by the lane speed 216 of the lane 214, the travel distance 234 meeting or exceeding the distance threshold 238, or a combination thereof. As a result, the navigation system 100 can minimize the resource required to execute the lane placement 222 to safely control the user's vehicle 206 on the road segment 204.

For a different example, the placement module 412 can determine the lane placement 222 based on the travel context 202. More specifically as an example, the travel context 202 can indicate that the lane speed 216 for each instance of the lane 214 changed due to an accident, a traffic jam, or a combination thereof on the road segment 204. As a result, the lane 214 with the fastest instance of the lane speed 216 is now the slowest instance of the lane 214 out of all the instances of the lane 214 of the road segment 204. The placement module 412 can determine the lane placement 222 to factor the traffic accident to place the user's vehicle 206 on the lane 214 that is fastest. More specifically as an example, prior to the traffic jam, the lane 214 closest to the center divider was fastest. However, the lane 214 furthest from the center divider is flowing at the lane speed 216 fastest out of all instances of the lane 214. The placement module 412 can determine the lane placement 222 for the user's vehicle 206 to be at the lane furthest from the center divider even though the travel time 232 meets or exceeds the time threshold 236, the travel distance 234 meets or exceeds the distance threshold 238, or a combination thereof. The placement module 412 can transmit the lane placement 222 to an execution module 414.

The navigation system 100 can include the execution module 414, which can be coupled to the placement module 412. The execution module 414 executes the lane merge operation 224 of FIG. 2. For example, the execution module 414 can execute the lane merge operation 224 based on the merge timing 226, the lane placement 222, or a combination thereof.

More specifically as an example, the execution module 414 can control the user's vehicle 206 to safely merge on to the lane 214 for the road segment 204 representing the highway from the road segment 204 representing the onramp based on the merge timing 226, the lane placement 222, or a combination thereof. For further example, if the lane placement 222 is determined for the user's vehicle 206 to be placed on the lane 214 closest to the center divider and there are multiple instances of the lane 214 in between the lane 214 closest and the lane 214 furthest from the center divider, the execution module 414 can execute the lane merge operation 224 by considering the merge timing 226 for merging into each instance of the lane 214.

The execution module 414 can execute the lane exit operation 228 of FIG. 2 based on the current location 212, the exit location 230, or a combination thereof. For example, the execution module 414 can execute the lane exit operation 228 based on the exit distance 240 of FIG. 2 meeting or exceeding the distance threshold 238. The execution module 414 can execute the lane exit operation 228 by including the lane merge operation 224 to safely guide the user's vehicle 206 to the exit location 230.

For illustrative purposes, the navigation system 100 is described with the segment module 406 determining the lane speed 216, although the segment module 406 can be operated differently. For example, the segment module 406 can update the lane speed 216 based on the travel context 202. The travel context 202 can change due to events including accident, traffic jam, or a combination thereof on the road segment 204. The segment module 406 can update the lane speed 216 for each instance of the lane 214 to regulate traffic flow of the road segment 204 to reduce traffic jam.

For illustrative purposes, the navigation system 100 is described with the obstacle module 408 determining the obstacle factor 242, although the obstacle module 408 can be operated differently. For example, the obstacle module 408 can update the obstacle factor 242 based on the travel context 202.

The obstacle module 408 can update the obstacle factor 242 in a number of ways. For example, the obstacle module 408 can update the obstacle speed 248 based on the change in the lane speed 216 where the obstacle vehicle 244 representing the other vehicle is traveling. For a different example, the obstacle module 408 can update the buffer distance 252 based on the change in the vehicle count 260 on the road segment 204. The travel context 202 can change from no traffic to heavy traffic due to the accident on the road segment 204. As a result, the physical distance between vehicles can be reduced due to the congestion on the road segment 204. The obstacle module 408 can adjust the buffer distance 252 by reducing the buffer distance 252 between the vehicles yet still meeting or exceeding the size threshold 262 for the user's vehicle 206 to safely merge into the lane 214.

For illustrative purposes, the navigation system 100 is described with the mode module 404 determining the operation mode 220, although the mode module 404 can be operated differently. For example, the mode module 404 can update the operation mode 220.

For a specific example, the mode module 404 can update the operation mode 220 based on the current location 212, the exit location 230 of FIG. 2, the road segment 204, or a combination thereof. More specifically as an example, the user's vehicle 206 can get on the road segment 204 representing the off ramp to reach the exit location 230 of the highway. The mode module 404 can update the operation mode 220 from automatic mode to manual mode once the current location 212 is on the off ramp to hand over the control of the user's vehicle 206 to the user.

For illustrative purposes, the navigation system 100 is described with the execution module 414 executing the lane exit operation 228, although the execution module 414 can be operated differently. For example, the execution module 414 can deny the lane exit operation 228, the lane merge operation 224, or a combination thereof.

The execution module 414 can deny the lane exit operation 228 in a number of ways. For example, the execution module 414 can deny the lane exit operation 228 based on the current location 212, the exit location 230, or a combination thereof. The user can change the exit location 230. However, the exit distance 240 between the exit location 230 and the current location 212 can be less than the distance threshold 238. As a result, the execution module 414 can deny the lane exit operation 228 for the user's vehicle 206 to try to exit the highway because such operation of the user's vehicle 206 is determined to be sudden and unsafe. In contrast, if the exit distance 240 meets or exceeds the distance threshold 238, the execution module 414 can execute the lane exit operation 228 to guide the user's vehicle to the exit location 230.

For further example, if the exit distance 240 is within the distance threshold 238, the execution module 414 can execute the lane exit operation 228 for the alternative exit location 230 of FIG. 2. The alternative exit location 230 can represent the exit location 230 different from the exit location 230 desired by the user to exit the highway from. For example, the alternative exit location 230 can represent the next exit for the user's vehicle 206 can take to get off the highway. The execution module 414 can deny the lane exit operation 228 for the exit location 230 desired but push the user's vehicle to the alternative exit location 230 to safely guide the user off the highway.

For a different example, the execution module 414 can deny the lane merge operation 224 based on the buffer distance 252 is less than the distance threshold 238. As discussed above, if the buffer distance 252 is less than the size threshold 262, the execution module 414 can deny the lane merge operation 224 because the user's vehicle size 208 is determined to meet or exceed the buffer distance 252, thus, unsafe for the user's vehicle 206 to merge into the lane 214.

The physical transformation from determining the obstacle factor 242 including the obstacle location 246, the obstacle speed 248, the obstacle size 250, the buffer distance 252, or a combination thereof results in the movement in the physical world, such as people using the first device 102, the vehicle, or a combination thereof, based on the operation of the navigation system 100. As the movement in the physical world occurs, the movement itself creates additional information that is transformed from physical aspect to digital data for further determination and/or execution of the merge timing 226, the lane placement 222, the lane merge operation 224, the lane exit operation 228, or a combination thereof for the continued operation of the navigation system 100 and to continue the movement in the physical world.

The first software 326 of FIG. 3 of the first device 102 of FIG. 3 can include the modules for the navigation system 100. For example, the first software 326 can include the location module 402, the mode module 404, the segment module 406, the obstacle module 408, the merge module 410, the placement module 412, and the execution module 414. The first control unit 312 of FIG. 3 can execute the modules to perform the functions dynamically and in real time.

The first control unit 312 can execute the first software 326 for the location module 402 to determine the current location 212. The first control unit 312 can execute the first software 326 for the mode module 404 to determine the operation mode 220. The first control unit 312 can execute the first software 326 for the segment module 406 to determine the lane speed 216.

The first control unit 312 can execute the first software 326 for the obstacle module 408 to determine the obstacle factor 242. The first control unit 312 can execute the first software 326 for the merge module 410 to determine the merge timing 226. The first control unit 312 can execute the first software 326 for the placement module 412 to determine and to execute the lane placement 222. The first control unit 312 can execute the first software 326 for the execution module 414 to execute the lane merge operation 224.

The second software 342 of FIG. 3 of the first device 102 of FIG. 3 can include the modules for the navigation system 100. For example, the second software 342 can include the location module 402, the mode module 404, the segment module 406, the obstacle module 408, the merge module 410, the placement module 412, and the execution module 414. The second control unit 334 of FIG. 3 can execute the modules to perform the functions dynamically and in real time.

The second control unit 334 can execute the second software 342 for the location module 402 to determine the current location 212. The second control unit 334 can execute the second software 342 for the mode module 404 to determine the operation mode 220. The second control unit 334 can execute the second software 342 for the segment module 406 to determine the lane speed 216.

The second control unit 334 can execute the second software 342 for the obstacle module 408 to determine the obstacle factor 242. The second control unit 334 can execute the second software 342 for the merge module 410 to determine the merge timing 226. The second control unit 334 can execute the second software 342 for the placement module 412 to determine and to execute the lane placement 222. The second control unit 334 can execute the second software 342 for the execution module 414 to execute the lane merge operation 224.

The modules of the navigation system 100 can be partitioned between the first software 326 and the second software 342. The second software 342 can include the mode module 404, the segment module 406, the obstacle module 408, the merge module 410, the placement module 412, and the execution module 414. The second control unit 334 can execute modules partitioned on the second software 342 as previously described.

The first software 326 can include the location module 402. Based on the size of the first storage unit 314, the first software 326 can include additional modules of the navigation system 100. The first control unit 312 can execute the modules partitioned on the first software 326 as previously described.

The first control unit 312 can operate the first communication unit 316 of FIG. 3 to transmit the current location 212, the operation mode 220, the lane speed 216, the obstacle factor 242, the merge timing 226, the lane placement 222, the lane merge operation 224, or a combination thereof to or from the second device 106 through the communication path 104 of FIG. 3. The first control unit 312 can operate the first software 326 to operate the location unit 320 of FIG. 3. The second control unit 334 can operate the second communication unit 336 of FIG. 3 to transmit the current location 212, the operation mode 220, the lane speed 216, the obstacle factor 242, the merge timing 226, the lane placement 222, the lane merge operation 224, or a combination thereof to or from the first device 102 through the communication path 104.

The navigation system 100 describes the module functions or order as an example. The modules can be partitioned differently. For example, the merge module 410 and the placement module 412 can be combined. Each of the modules can operate individually and independently of the other modules. Furthermore, data generated in one module can be used by another module without being directly coupled to each other. For example, the merge module 410 can receive the current location 212 from the location module 402. Further, one module transmitting to another module can represent one module communicating, sending, receiving, or a combination thereof the data generated to or from another module.

The modules described in this application can be hardware implementation or hardware accelerators in the first control unit 312 or in the second control unit 334. The modules can also be hardware implementation or hardware accelerators within the first device 102 or the second device 106 but outside of the first control unit 312 or the second control unit 334, respectively as depicted in FIG. 3. However, it is understood that the first control unit 312, the second control unit 334, or a combination thereof can collectively refer to all hardware accelerators for the modules. Furthermore, the first control unit 312, the second control unit 334, or a combination thereof can be implemented as software, hardware, or a combination thereof.

The modules described in this application can be implemented as instructions stored on a non-transitory computer readable medium to be executed by the first control unit 312, the second control unit 334, or a combination thereof. The non-transitory computer medium can include the first storage unit 314, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital versatile disk (DVD), or universal serial bus (USB) flash memory devices. The non-transitory computer readable medium can be integrated as a part of the navigation system 100 or installed as a removable portion of the navigation system 100.

Figure 5:
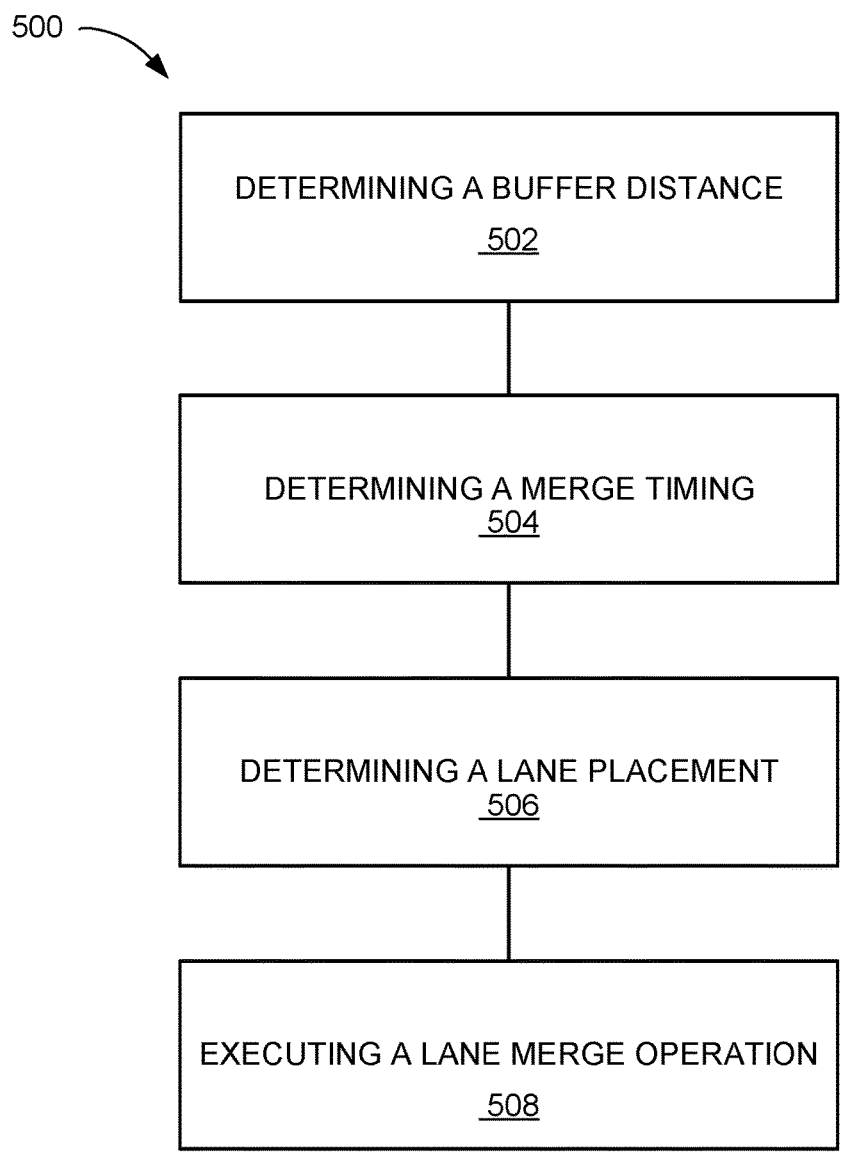
FIG. 5 is a flow chart of a method of operation of the navigation system in a further embodiment of the present invention.

Referring now to FIG. 5, therein is shown a flow chart of a method 500 of operation of the navigation system 100 in a further embodiment of the present invention. The method 500 includes: determining a buffer distance meeting or exceeding a size threshold between obstacle locations in a block 502; determining a merge timing based on a current location relative to the buffer distance in a block 504; determining a lane placement based on a travel time meeting or exceeding a time threshold in a block 506; and executing a lane merge operation with a control unit based on the merge timing, the lane placement, or a combination thereof for guiding a user's vehicle to merge onto a lane different from currently traveled in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    determining a buffer distance meeting or exceeding a size threshold between obstacle locations;
    determining a merge timing based on a current location relative to the buffer distance;
    determining a lane placement based on a travel time meeting or exceeding a time threshold wherein the travel time represents a time required to travel from a start location to a target destination and the lane placement determined based on comparing the travel time to multiple instances of the time threshold for selecting a lane wherein each lane placement has the time threshold set differently from one another; and
    executing a lane merge operation with a control unit based on the merge timing, the lane placement, or a combination thereof for guiding a user's vehicle to merge onto the lane different from currently traveled.

2. The method as claimed in claim 1 wherein determining the lane placement includes determining the lane placement based on a travel distance meeting or exceeding a distance threshold.

3. The method as claimed in claim 1 further comprising switching an operation mode based on the current location relative to a road segment.

4. The method as claimed in claim 1 further comprising adjusting a lane speed based on a travel context for controlling a travel speed, an obstacle speed, or a combination thereof.

5. The method as claimed in claim 1 wherein determining the buffer distance includes determining the buffer distance based on a physical distance between the obstacle locations greater than a user's vehicle size.

6. The method as claimed in claim 1 wherein determining the buffer distance includes determining multiple instances of the buffer distance different from one another based on a travel context.

7. The method as claimed in claim 1 further comprising generating the buffer distance based on adjusting an obstacle speed to create a physical space meeting or exceeding a size threshold for allowing the user's vehicle to merge into the lane.

8. The method as claimed in claim 1 further comprising adjusting the merge timing based on a travel context for adjusting the merge timing to different instances of the buffer distance within the travel context.

9. The method as claimed in claim 1 further comprising denying a lane exit operation based on an exit distance below a distance threshold.

10. The method as claimed in claim 1 further comprising guiding to an alternative exit location based on an exit distance below a distance threshold.

11. A navigation system comprising:
    a control unit for:
        determining a buffer distance meeting or exceeding a size threshold between obstacle locations;
        determining a merge timing based on a current location relative to the buffer distance;
        determining a lane placement based on a travel time meeting or exceeding a time threshold wherein the travel time represents a time required to travel from a start location to a target destination and the lane placement determined based on comparing the travel time to multiple instances of the time threshold for selecting a lane wherein each lane placement has the time threshold set differently from one another;
        executing a lane merge operation based on the merge timing, the lane placement, or a combination thereof; and
    a communication unit, coupled to the control unit, for transmitting the lane merge operation for guiding a user's vehicle to merge onto the lane different from currently traveled.

12. The system as claimed in claim 11 wherein the control unit is for determining the lane placement based on a travel distance meeting or exceeding a distance threshold.

13. The system as claimed in claim 11 wherein the control unit is for switching an operation mode based on the current location relative to a road segment.

14. The system as claimed in claim 11 wherein the control unit is for adjusting a lane speed based on a travel context for controlling a travel speed, an obstacle speed, or a combination thereof.

15. The system as claimed in claim 11 wherein the control unit is for determining the buffer distance based on a physical distance between the obstacle locations greater than a user's vehicle size.

16. A non-transitory computer readable medium including instructions for execution, the instructions comprising:
    determining a buffer distance meeting or exceeding a size threshold between obstacle locations;
    determining a merge timing based on a current location relative to the buffer distance;
    determining a lane placement based on a travel time meeting or exceeding a time threshold wherein the travel time represents a time required to travel from a start location to a target destination and the placement determined based on comparing the travel time to multiple instances of the time threshold for selecting a lane wherein each lane placement has the time threshold set differently from one another; and
    executing a lane merge operation based on the merge timing, the lane placement, or a combination thereof for guiding a user's vehicle to merge onto the lane different from currently traveled.

17. The non-transitory computer readable medium as claimed in claim 16 wherein determining the lane placement includes determining the lane placement based on a travel distance meeting or exceeding a distance threshold.

18. The non-transitory computer readable medium as claimed in claim 16 further comprising switching an operation mode based on the current location relative to a road segment.

19. The non-transitory computer readable medium as claimed in claim 16 further comprising adjusting a lane speed based on a travel context for controlling a travel speed, an obstacle speed, or a combination thereof.

20. The non-transitory computer readable medium as claimed in claim 16 wherein determining the buffer distance includes determining the buffer distance based on a physical distance between the obstacle locations greater than a user's vehicle size.

* * * * *